United States Patent Office 2,908,113
Patented Oct. 13, 1959

2,908,113

PROCESS FOR PRODUCING MICRO-ORGANISMS AND SOIL CONDITIONERS

James Francis Martin, Tolleson, Ariz., assignor to Arizona Activite, Inc., Phoenix, Ariz., a corporation of Arizona No Drawing. Application March 12, 1956
Serial No. 570,716

13 Claims. (Cl. 47—58)

This invention relates to a process for producing micro-organisms and products which have soil conditioning properties and other beneficial uses.

Green and blue-green algae sometimes exist in fresh water and when in ocean water these may be known generally as the phytoplanktons. A considerable amount of research has been directed toward domestic propagation of algae and related products for use as soil conditioning agents for agricultural purposes.

Accordingly, it is an object of the present invention to provide a process for utilization of the phytoplankton for propagating algae and producing a soil conditioning agent at will and in sufficient volume for practical application to large tracts of soil to increase agricultural production.

Another object of the invention is to provide a process, for producing a soil conditioner, which is very simple and economical to perform and which produces a stable cultured material having characteristics which permit it continually to propagate itself over great periods of time.

Another object of the invention is to provide a process involving a novel combination of organisms from ocean water and excrement from milking cows, to produce a culture having soil conditioning characteristics and which has reproduction characteristics which are true and stable.

Another object of the invention is to provide a process for producing a soil conditioner which may utilize the excrement from one dairy barn to supply vast areas of soil with soil conditioning material to promote agriculture production.

A further object of the invention is to provide a process for producing material which is useful as an additive to drinking water for feeding cattle and or other livestock.

A still further object of the invention is to provide a process for producing material which may be valuable as a food supplement or therapeutic agent for consumption by various animals and/or human beings.

Other objects and advantages of the invention may be apparent from the following specification and appended claims.

The first step in the process for producing micro-organisms and products in accordance with the present invention involves the use of sea water in a culture medium as will be hereinafter described.

Excrement from milking cows is obtained and is carefully filtered. This filtered excrement is added to sea water to produce a primary culture. The sea water and excrement from milking cows is mixed in a container and is permitted to stand for a period of time which may extend throughout 369 days or less. This culture as referred to herein is a master culture used in the present process for producing micro-organisms and products in accordance with the present invention.

The next step of the present process includes the placement of excrement from milking cows in a tank of water wherein the excrement may constitute approximately 3% of the contents of the tank. Cultured yeast is then applied to the mixture of excrement and water in the presence of a substantial amount of master culture previously described. Suitable initial proportions of water, excrement, yeast and the master culture are as follows.

| | | |
|---|---|---|
| Water | gallons__ | 20,000 |
| Excrement | do____ | 600 |
| Yeast | pounds__ | 3 |
| Master culture | ounce__ | ¼ |

It will be understood that more or less of the master culture may be applied to the tank as desired in order to fully inoculate the mixture therein.

The tank containing the excrement, water, yeast and master culture is termed a digester wherein putrefaction, fermentation, and digestion takes place and into which the excrement from milking cows must be added to continue the process. Solids rise to the top of the tank and are preferably removed daily while new charges of excrement from the milking cows are added. After about fourteen days liquid is extracted from an upper level of the digester tank and is transferred to a second tank which then contains the supernatant fluid drawn from the material in the digester.

The supernatant fluid is then removed in small quantities and placed in a water containing culture tank wherein the final culture of the supernatant fluid propagates micro-organisms and products having soil conditioning characteristics. One part of the supernatant fluid in proportion to twenty or more parts of water in the culture tanks provides for production of the micro-organisms and products having soil conditioning characteristics. When the supernatant fluid is first applied to the culture tanks, it is permitted to remain there approximately 14 days to permit a green algae-like organism to grow therein. Then a small flow of fresh water is fed into and out of the upper levels of the culture tanks so that the organisms may continue to propagate in the water while the concentrated material is periodically drawn from the bottom of these tanks to prevent excessive accumulation therein.

Fluid drawn from the culture tanks may be applied to water in the soil and thereby augmenting agricultural production.

It has been found that product taken from the culture tanks may be held in container for great periods of time during which properties of the material remain stable.

While the present arts of biological or botanical science contain no specific explanation for the production of material according to the present process and particularly in connection with the production of such material which has characteristics of that produced by the present process these phenomena have been fully demonstrated and successfully utilized.

It has been found that material produced by the present process when applied or introduced into drinking water for live stock or poultry creates beneficial effects.

It will be understood that modifications of the present invention may be resorted to in a manner limited only by a just interpretation of the following claims.

I claim:
1. A process for producing products having soil conditioning characteristics consisting of mixing sea water and excrement from milking cows and then permitting the mixture to stand a period of time until a culture is produced.

2. A process for producing a soil conditioner consisting of mixing sea water with excrement from milking cows, the excrement being a minor portion of the mixture and then permitting the mixture to stand a period of time until a culture is produced.

3. A process for producing products having soil conditioning characteristics consisting of mixing sea water and excrement from milking cows and then permitting the mixture to stand a period of time until a culture is produced then placing the culture in a digester tank in the presence of additional water and excrement from milking cows together with cultured yeast, then permitting a fermentation process to produce a supernatant fluid which contains a final culture then withdrawing said supernatant fluid from an upper level of the digester tank and then applying said supernatant fluid to water in a final culture tank.

4. A process for producing products having soil conditioning characteristics consisting of mixing sea water and excrement from milking cows and then permitting the mixture to stand a period of time until a culture is produced then placing the culture in a digester tank in the presence of additional water and excrement from milking cows together with cultured yeast, then permitting a fermentation process to produce a supernatant fluid which contains a final culture then withdrawing said supernatant fluid from an upper level of the digester tank and then applying said supernatant fluid to water in a final culture tank, said supernatant fluid being proportioned to the water in said tank in a ratio of one part or more of supernatant fluid to twenty or more parts of water in the culture tank.

5. A process for producing products having soil conditioning characteristics consisting of mixing sea water and excrement from milking cows and then permitting the mixture to stand a period of time until a culture is produced then placing the culture in a digester tank in the presence of additional water and excrement from milking cows together with cultured yeast, then permitting a fermentation process to produce a supernatant fluid which contains a final culture then withdrawing said supernatant fluid from an upper level of the digester tank and then applying said supernatant fluid to water in a final culture tank, said supernatant fluid being proportioned to the water in said tank in a ratio of one part or more of supernatant fluid to twenty or more parts of water in the culture tank then permitting said mixture in said culture tank to stand approximately fourteen days and thereafter feeding fresh water into the upper levels of said tank.

6. A process for producing products having soil conditioning characteristics consisting of mixing sea water and excrement from milking cows and then permitting the mixture to stand a period of time until a culture is produced then placing the culture in a digester tank in the presence of additional water and excrement from milking cows together with cultured yeast, then permitting a fermentation process to produce a supernatant fluid which contains a final culture then withdrawing said supernatant fluid from an upper level of the digester tank and then applying said supernatant fluid to water in a final culture tank, said supernatant fluid being proportioned to the water in said tank in a ratio of one part or more of supernatant fluid to twenty or more parts of water in the culture tank and thereby maintaining a concentrated culture in only the lower fourth of the culture tank to prevent destruction thereof by putrefaction.

7. A process for producing products having soil conditioning characteristics consisting of first mixing sea water and liquid excrement from milking cows then permitting the mixture to stand until a master culture is produced then placing the master culture so produced in a digesting tank in the presence of additional water excrement from milking cows together with cultured yeast, the volume of excrement in said digester tank being equal to about three precent of the volume of water therein, the weight of the master culture being minor with respect to that of said yeast then permitting a fermentation process to produce a supernatant fluid which contains a final culture, then withdrawing said supernatant fluid from an upper level of the digester tank and then applying said supernatant fluid to water in a final culture tank.

8. A process for producing products having soil conditioning characteristics consisting of first mixing sea water and liquid excrement from milking cows then permitting the mixture to stand until a master culture is produced then placing the master culture so produced in a digesting tank in the presence of additional water and excrement from milking cows together with cultured yeast, the volume of excrement in said digester tank being equal to about three percent of the volume of water therein, the weight of the master culture being minor with respect to that of said yeast then permitting a fermentation process to produce a supernatant fluid which contains a final culture, then withdrawing said supernatant fluid from an upper level of the digester tank and then applying said supernatant fluid to water in a final culture tank, said supernatant fluid being proportioned to the water in said tank in a ratio of one part of supernatant fluid to twenty or more parts of water in the final culture tank.

9. A process for producing products having soil conditioning characteristics consisting of first mixing sea water and liquid excrement from milking cows then permitting the mixture to stand until a master culture is produced then placing the master culture so produced in a digesting tank in the presence of additional water and excrement from milking cows together with cultured yeast, the volume of excrement in said digester tank being equal to about three percent of the volume of water therein, the weight of the master culture being minor with respect to that of said yeast then permitting a fermentation process to produce a supernatant fluid which contains a final culture, then withdrawing said supernatant fluid from an upper level of the digester tank and then applying said supernatant fluid to water in a final culture tank, said supernatant fluid being proportioned to the water in said tank in ratio of one part of supernatant fluid to twenty or more parts of water in the culture tank then permitting said mixture in said culture tank to stand approximately fourteen days and thereafter feeding fresh water into the upper level of said tank and permitting water concurrently to flow out of the upper level of said last mentioned tank.

10. A process for producing a material, consisting of mixing sea water with waste material; then inducing a fermentation process in the mixture until a supernatant fluid is produced and then applying the supernatant fluid to fresh water.

11. A process for producing material consisting of mixing sea water and waste material then adding yeast to the mixture then permitting fermentation of the mixture until a supernatant fluid is produced then draining fluid from the mixture and adding the same to water and permitting a culture to grow in the water then applying the culture to water in the soil.

12. A process for producing micro-organisms consisting of mixing elements from sea water and excrement from milking cows, then permitting the mixture to stand until a fluid concentrate is produced and then adding said fluid to fresh water.

13. A process for producing micro-organisms consisting of mixing elements from sea water and excrement from milking cows, then inducing fermentation of the mixture and permitting the mixture to stand until a fluid concentrate is produced and then adding said fluid to fresh water.

References Cited in the file of this patent

UNITED STATES PATENTS 100,871    Diaz ------------------ Mar. 15, 1870

OTHER REFERENCES

Ludwig et al.: "Role of Algae in Sewage Oxidation Ponds," published January 1952 in Scientific Monthly (Magazine), vol. 74, pages 3, 4, 5, 6.

"Algal Culture" (Burlew), Carnegie Institution of Washington (D. C.), publication 600 (1953), pages 301 and 302 relied on.

Newsweek (Magazine), February 16, 1953, vol. 41, No. 7, pages 35, 36, 38, 39; article, "Disasters: The Sea in the Fields."

Saturday Evening Post (Magazine), May 9, 1953, vol. 225, No. 45, pages 19, 20, 21, 118, 119, 122; article, "The Dutch Strike Back Against the Sea" by E. O. Hauser.